United States Patent [19]

Bedzyk

[11] Patent Number: 5,220,460
[45] Date of Patent: Jun. 15, 1993

[54] ADJUSTABLE MOUNT FOR CYLINDRICAL LENS WITH TORQUE APPLIED DIRECTLY TO LENS

[75] Inventor: Mark Bedzyk, Rochester, N.Y.

[73] Assignee: Eastman Kodak Company, Rochester, N.Y.

[21] Appl. No.: 785,469

[22] Filed: Oct. 31, 1991

Related U.S. Application Data

[63] Continuation-in-part of Ser. No. 765,161, Sep. 24, 1991.

[51] Int. Cl.$^5$ .............................................. G02B 7/02
[52] U.S. Cl. ..................................... 359/813; 359/819
[58] Field of Search ............... 359/813, 819, 820, 830, 359/808, 809, 827

[56] References Cited

U.S. PATENT DOCUMENTS

| | | | |
|---|---|---|---|
| 3,204,471 | 9/1965 | Rempel | 74/89 |
| 3,359,849 | 12/1967 | Friedman | 359/813 |
| 3,596,863 | 8/1971 | Kaspareck | 248/278 |
| 3,722,990 | 3/1973 | Vondran | 350/247 |
| 3,989,358 | 11/1976 | Melmoth | 350/247 |
| 4,077,722 | 3/1978 | Bicskei | 356/127 |
| 4,099,852 | 7/1978 | Kobierecki et al. | 350/247 |
| 4,408,830 | 10/1983 | Wutherich | 350/247 |
| 4,652,095 | 3/1987 | Mauro | 350/531 |
| 4,655,548 | 4/1987 | Jue | 350/245 |
| 4,769,803 | 9/1988 | Yamamia | 350/245 |
| 4,796,962 | 1/1989 | Dejager et al. | 350/6.8 |
| 4,838,649 | 6/1989 | Ichikawa | 350/247 |
| 4,909,599 | 3/1990 | Hanke et al. | 350/252 |
| 4,921,320 | 5/1990 | Dejager et al. | 350/6.8 |
| 4,962,079 | 10/1990 | Owens et al. | 346/108 |
| 4,982,206 | 1/1991 | Kessler et al. | 346/108 |

FOREIGN PATENT DOCUMENTS 0177815 4/1986 European Pat. Off. ............ 359/813

Primary Examiner—Eugene R. LaRoche
Assistant Examiner—A. Zavabian
Attorney, Agent, or Firm—Warren Locke Franz

[57] ABSTRACT

A lens mount for positioning a cylindrical lens in x, y, z and $\theta_x$, $\theta_y$, $\theta_z$ directional degrees of freedom includes a carrier with a lens-receiving cavity and a spring acting in the cavity adjacent one corner of the lens to apply a biasing torque in the $\theta_z$ direction directly on the lens. The lens is positioned with a planar x-y surface against a corresponding planar x-y surface of the cavity. A plate-like retainer wraps around an opposite curved surface of the lens to hold it in the cavity. Lens adjustments in the magnification x or y axis and $\theta_z$ directions are made against the applied bias by locating screws which pass through the carrier and contact the lens. The $\theta_z$ bias loads opposite lens edges against the $\theta_z$ locating screw and a guide pin, during translational adjustment.

20 Claims, 2 Drawing Sheets

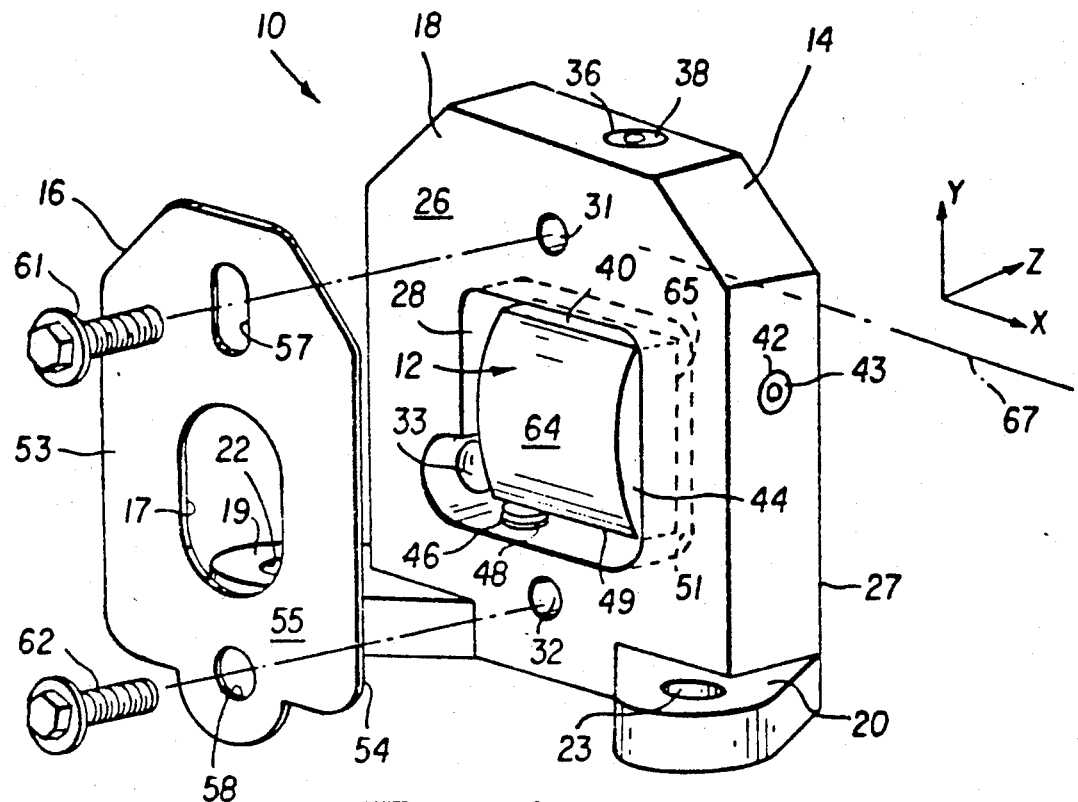
FIG-1
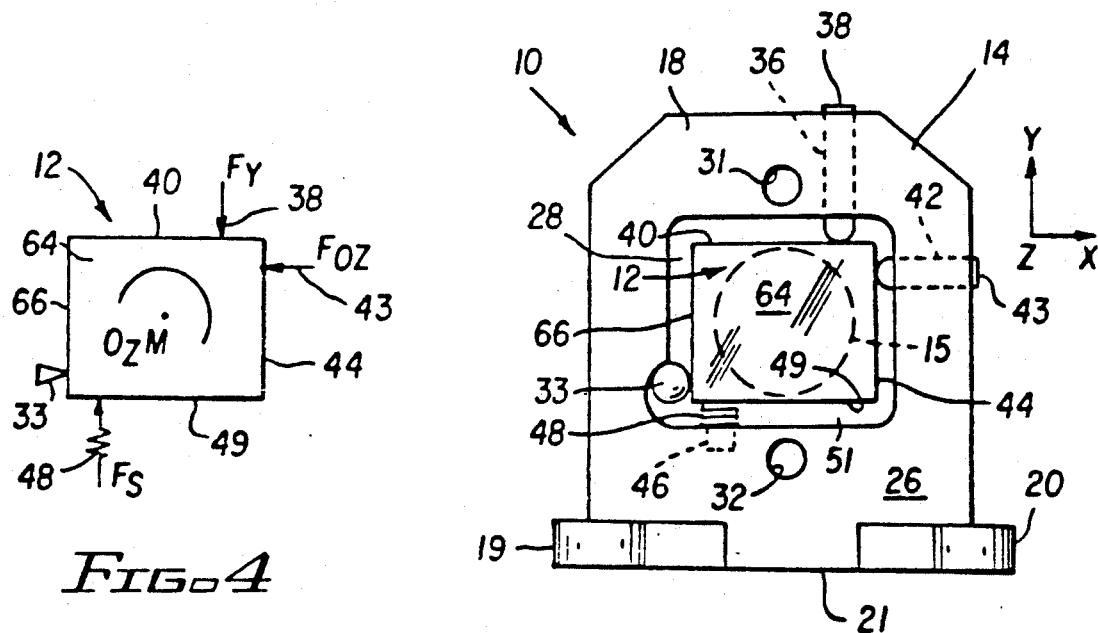
FIG-4
FIG-2

ADJUSTABLE MOUNT FOR CYLINDRICAL LENS WITH TORQUE APPLIED DIRECTLY TO LENS

This is a continuation-in-part of U.S. patent application Ser. No. 07/765,161 filed Sept. 24, 1991, entitled "Adjustable Mount for Cylindrical Lens."

This application deals with subject matter similar to that of U.S. patent application Ser. No. 07/785,559, entitled "Adjustable Mount for Cylindrical Lens With Independent Rotational Feature," filed on even date herewith, the disclosure of which is incorporated herein by reference.

TECHNICAL FIELD

This invention relates generally to a device for adjustably mounting an optical element in an optical system; and, in particular, to an improved device for mounting a cylindrical lens, adjustably in rotational $\theta_z$ and translational x or y directions, in an optical system like that of a laser printer, wherein a biasing torque is applied directly to the lens.

BACKGROUND ART

The positioning of a lens, mirror or similar optical element (hereafter "lens") involves spatially locating such element in six degrees of freedom. The lens is located translationally relative to each of three orthogonal axes directions generally designated as the x(scan), y(cross-scan), and z(beam path) axes directions. The lens is also located rotationally relative to three rotational directions, generally designated as the $\theta_x$, $\theta_y$ and $\theta_z$ directions, corresponding to angular rotation, respectively, about each of the x, y and z axes.

Monolithic spherical lenses having one curved surface provide power magnification in two orthogonal directions x and y, and focus parallel rays at a focal point corresponding to the center of curvature of the lens surface. Such lenses are used in laser printers, e.g., for controlling beam spot size, convergence and focusing. Correct positioning of such spherical lenses in the x, y translational and $\theta_x$, $\theta_y$ rotational directions assures alignment of the focal point and center of the lens relative to an incident beam of light coincident with the z axis. Correct location of the lens along the z axis serves to assure proper focusing of an imaged object. Considerations for locating conjugate and composite spherical lens elements are similar.

Monolithic cylindrical lenses having one curved surface provide magnification in only one direction x or y and focus parallel rays to a line or lens cylinder axis parallel to the other direction y or x. Such lenses are used in laser printers, e.g., for beam shaping, such as for controlling x-direction or y-direction elliptical beam spot size. Cylindrical lenses may be manufactured to have a planar surface opposite the curved surface which is generally parallel to the x-y plane. Such a lens can, thus, be located in the $\theta_x$ and $\theta_y$ rotational directions by orienting the x-y planar surface normal to the incident beam z axis direction. Variations in positioning in the non-magnification direction (i.e. variations in the y direction for magnification in the x direction, and vice versa) are not critical. Thus, once correct orientation of the x-y planar surface is established, locational precision will be needed only in the x or y magnification translational and $\theta_z$ rotational directions.

Traditional mounts for multiple degree of freedom positioning of optical elements nest multiple structural components for independent relative movement, one with respect to the other, to achieve the required translational and/or rotational positioning. U.S. Pat. No. 4,652,095, for example, describes an arrangement of three nested stages, each . having a table shiftable along rails in a respective x, y or z translational direction by a threaded rod movable against the force of an opposing spring. The stages are nested, with the optical element mounted for movement with the table of the first stage, the first stage mounted for movement with the table of the second stage, and the second stage mounted for movement with the table of the third stage. U.S. Pat. No. 3,596,863 shows an arrangement of nested flexural pivots, each providing a respective $\theta_x$, $\theta_y$, or $\theta_z$ rotational adjustment. Other examples of nested optical element mounting arrangements are given in U.S. Pat. Nos. 3,204,471; 4,077,722; 4,099,852; and 4,655,548.

Mounting arrangements that provide multiple degree of freedom lens positioning, without nesting, are shown in U.S. Pat. Nos. 3,989,358 and 4,408,830. The '358 patent provides independent x and y translational adjustments by micrometer spindles that are moved against knife-edges, displaced 90° circumferentially about a lens retaining ring. The '830 patent provides x, y and x-y translational adjustments by moving inclined faces of screw-driven cradle elements against corresponding angled corners of a rectangular lens retainer.

Conventional devices for achieving six-degree of freedom positioning of optical elements tend to be unduly complex and costly. Moreover, when used for mounting cylindrical lenses in optical systems like those of laser printers or the like, the precise machining utilized to ensure correct positioning in critical directions, is wasted when applied also for noncritical ones. In general, prior art mounts seek to avoid the exertion of any torque directly on the lens itself. See, U.S. Pat. No. 4,909,599.

Applicant's U.S. patent application Ser. No. 07/765,161, entitled "Adjustable Mount for Cylindrical Lens," filed Sept. 24, 1991, describes an inexpensive lens mount for positioning a cylindrical lens or similar optical element in an optical system like that of a laser printer, wherein six degree of freedom positioning is achieved with a minimum of nesting, taking advantage of physical characteristics of the lens, and employing a push-pull mechanism for applying a biasing torque on the lens, against which adjustments in the x or y axis magnification direction and $\theta_z$ rotational direction are made. The disclosure of that application is incorporated herein and made a part hereof by reference thereto.

In a preferred embodiment of the device described in the '161 application, $\theta_x$, $\theta_y$ positioning of the lens is achieved by abutting a planar surface, opposite a curved cylindrical surface, of the lens against a corresponding planar surface of an oversized cavity of a lens carrier. The carrier includes planar pads that load up against corresponding planar surfaces of a railed base member of the optical system supporting structure to assure that the cavity planar surface is oriented in the x-y vertical plane. Positioning in the y or x axis non-magnification direction is non-critical and is achieved by other elements in the carrier cavity. Positioning in the x or y axis magnification direction is achieved by fitting planar edge surfaces of the lens in abutment with corresponding planar edge surfaces of a cavity of a lens retaining member, and utilizing a push-pull mechanism to shift the retainer in the magnification direction relative to the lens carrier. The same push-pull mechanism operates to bias the lens clockwise in the $\theta_z$ rotational direction about a pivot point provided in the carrier cavity. Rotational positioning in the $\theta_z$ direction is accomplished by moving a member into the carrier cavity into contact with the lens, to pivot the lens about the same pivot point in opposition to the biasing torque. Means for adjusting the lens in the z axis focus direction in the disclosed embodiment comprises a mechanism for locking the lens carrier in selected position along a rail directed in the z axis direction. Fasteners, threaded through aligned bores of the retainer and carrier, serve to lock the lens after making the x or y and $\theta_z$ adjustments. Those bores are elongated in the x or y magnification direction in the retainer to permit movement of the retainer in that direction relative to the carrier.

The '161 device utilizes an internal cavity that holds the lens, and against which the push-pull mechanism is applied. The present invention modifies the device shown in the '161 application by applying the biasing torque directly on the lens. The lens carrier can thereby be greatly simplified, and the lens retainer which loads the lens against the x-y planar surface of the carrier can be replaced by a simple plate.

DISCLOSURE OF THE INVENTION

It is an object of the present invention to provide an improved inexpensive lens mount for positioning a cylindrical lens or similar optical element in six degrees of freedom, providing precise translational adjustment in the x or y axis magnification direction, as well as precise rotational adjustment in the $\theta_z$ rotational direction.

It is another object of the invention to provide an inexpensive lens mount for the six degree of freedom positioning of a cylindrical lens, that employs principles similar to those employed with the lens mount of Applicant's U.S. patent application Ser. No. 07/765,161, but which applies a biasing torque and adjustment mechanisms directly to the lens.

In accordance with the invention, a device is provided for positioning a cylindrical lens, or similar optical element, translationally with respect to x, y, z orthogonal axes directions and angularly relative to $\theta_x$, $\theta_y$, $\theta_z$ directions respectively rotationally about the x, y, z axes directions. The device includes means, directly applied to the lens, for biasing the lens in the x or y axis magnification and $\theta_z$ rotational directions; means, directly applied to the lens, for adjustably locating the lens in the x or y axis magnification direction against the applied bias; and means, directly applied to the lens, for adjustably locating the lens in the $\theta_z$ direction against the applied bias.

In a preferred embodiment described in greater detail below, as with the embodiments disclosed in the '161 application, $\theta_x$, $\theta_y$ positioning is achieved utilizing a lens retainer to abut a planar surface of the lens against a corresponding planar surface of an oversized cavity of a lens carrier. However, unlike the '161 application arrangements wherein positioning of the lens in the x or y axis magnification and $\theta_z$ rotational directions is achieved indirectly by adjusting the position of the retainer relative to the carrier, in the device of the present invention such adjustments are applied directly to the lens. A spring acting in the cavity in conjunction with a guide pin against a corner of the lens, biases the lens in both x or y axis and $\theta_z$ rotational directions against the action of x or y and $\theta_z$ locating pins which contact a point proximate a diagonally opposite corner of the lens. Rotational adjustment in the $\theta_z$ direction is accomplished by moving the $\theta_z$ locating pin, to pivot the lens about the guide pin in opposition to the $\theta_z$ biasing torque. Translational adjustment in the x or y axis magnification direction is accomplished by moving the x or y locating pin, to translate the lens between the guide pin and $\theta_z$ locating pin in opposition to the x or y direction biasing force. The $\theta_z$ biasing torque loads opposite sides of the lens against the guide pin and $\theta_z$ locating pin during the translational adjustment. Fasteners, threaded through aligned bores of the retainer and carrier, serve to lock the lens in position after making the x or y and $\theta_z$ adjustments.

The lens mount of the invention provides a device for positioning a cylindrical lens in six degrees of freedom, in an inexpensive way, utilizing precise machining only where needed, and with biasing and locating mechanisms applied directly to the lens. Positioning is achieved with precision machining needed only in a single element, the carrier; the retainer serving merely to hold the lens in position on the carrier.

BRIEF DESCRIPTION OF THE DRAWINGS

Embodiments of the invention have been chosen for purposes of illustration and description, and are shown in the accompanying drawings, wherein:

FIG. 1 is an exploded perspective view of a cylindrical lens mount in accordance with the invention;

FIG. 2 is a front view of the mounts of FIG. 1

FIG. 4 is a schematic view helpful in understanding the operation of the mount of FIGS. 1-2.

Throughout the drawings, like elements are referred by like numerals.

MODE OF CARRYING OUT THE INVENTION

Figure 3:
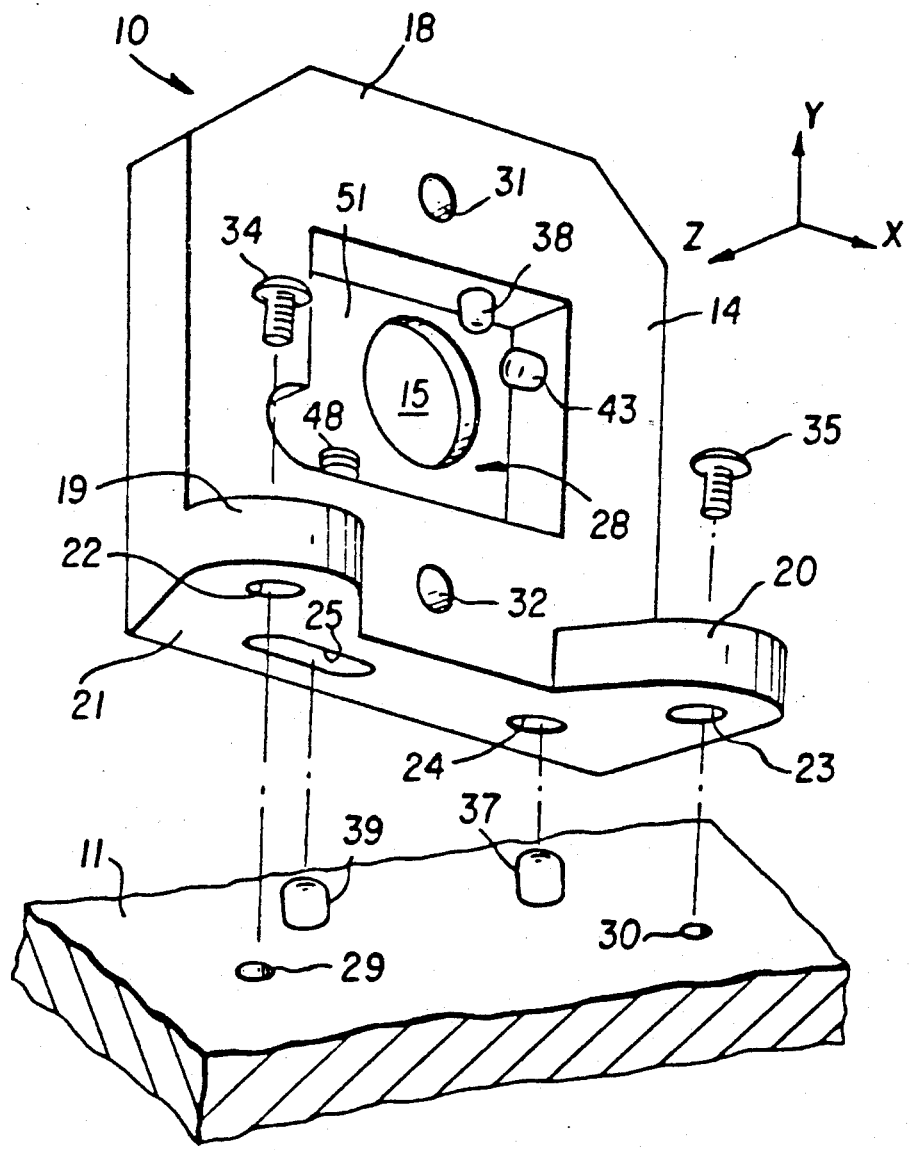
FIG. 3 is another perspective view of the mount of FIG. 1.

The principles of the invention are illustrated with reference to an exemplary device 10, suitable for positioning a cylindrical lens 12 or the like optical element translationally with respect to x, y, z orthogonal axes directions and rotationally with respect to $\theta_x$, $\theta_y$, $\theta_z$ directions in an optical system, such as that of a laser printer, described in Applicant's U.S. patent application Ser. No. 07/765,161.

A typical optical system of the type to which the invention finds application includes an optical head for projecting a beam of laser light along an optical beam path coincident with a z axis direction. The beam is modulated in accordance with information received from an image signal generating circuit, and scanned line-by-line in an x axis (scan) direction by means of a rotating polygon onto a photosensitive film or other similar receiving medium. The medium is in turn moved in a y axis (cross-scan) direction by means of a rotating drum or the like. A start-of-scan detector controls the timing of the light beam modulation. Optical elements, including cylindrical lenses like the lens 12, are positioned between the optical head and the mirrored multiple facets of the polygon to control beam shaping, focusing and direction. Other optical elements, located between the polygon and the drum, correct for differences in beam focus due to the f-$\theta$ condition and focus the image in the cross-scan direction to avoid objectionable banding artifacts due to facet out-of-plane wobble and pyramid angle errors. Additional details concerning the functioning and operation of laser printers are given in U.S. patent application Ser. No. 637,429, entitled "Laser Printing," filed Jan. 1, 1991, and in U.S. Pat. Nos. 4,397,521; 4,796,962; 4,982,206; and 4,921,320.

The mount 10 (FIGS. 1-3) is suitable to locate the cylindrical lens 12 (omitted for clarity from FIG. 3) for use in shaping the elliptical form of the scanning beam in either the x or y axis direction and for controlling its $\theta_z$ angular orientation. The illustrated lens 12 is mounted with its magnification (or curvature) direction belong in the y axis direction. Those skilled in the art to which the invention relates will, however, appreciate same principles apply for mounting a lens having an x axis magnification direction.

The mount 10 comprises a lens carrier 14 including a central optical opening 15 (shown in dashed lines in FIG. 2 and in FIG. 3), and a lens retainer 16 including a corresponding opening 17. (The retainer 16 is omitted for clarity from FIGS. 2 and 3.) The opening 1 is a circular opening formed concentrically parallel with the z axis. The opening 17 is similarly configured, except that it is elongated in the y axis direction. The illustrated carrier 14 is configured for fixed attachment in a z axis direction position on a stationary structure 11 (FIG. 3) that supports all of the components of the optical assembly. The mount 10 may, however, alternately be configured to interact with an underlying base to provide adjustment longitudinally in the z axis direction, as done with the corresponding carrier element described and shown in the '161 application.

The carrier 14 comprises a generally planar vertical portion 18 extending upwardly from a pair of outwardly-angled, forwardly extending horizontal pedestal members 19, 20. The undersurface 21 of carrier 14 lies in the x-z plane Vertical through bores 22, 23 in the members 19, 20 and upwardly directed blind bore 24 and slot 25 in the undersurface 21 provide means for attachment of the carrier 14 in a fixed z axis direction position on a corresponding x-z planar surface of underlying optical system structure 11 (FIG. 3). The spacing of bores 22, 23 is chosen to match the spacing of corresponding tapped hole attachment points 29, 30 on the underlying structure 11, so that threaded screws or similar fasteners 34, 35 can be tightened down through the bores 22, 23 and into holes 29, 30 to hold the lens 12 down against the x-z planar surface of structure 11. Locator pins 37, 39 project up from the structure 11, fit into the bore 24 and slot 25 of the carrier 14 and act together with surfaces 11, 21 to set the $\theta_x$, $\theta_y$ rotational and z axis translational directions, as further described below. The bores 22,23 are oversized relative to the hold down screws 34, 35. The bore 24 and slot 25, however, closely match the pins 37, 39.

The vertical portion 18 has parallel, front and rear vertical surfaces 26, 27. A generally rectangular lens-receiving cavity 28 is formed in the front surface 26, with horizontal and vertical dimensions slightly larger than the corresponding dimensions of the lens 12. Threaded bores 31, 32 extend in the z axis direction between surfaces 26, 27 in respective positions above and below the cavity 28. A guide pin or rib 33 is received, axially oriented in the z axis direction, within an enlargement in the left edge surface of the cavity 28, proximate the bottom left corner of the cavity 28. A threaded bore 36 (dashed lines in FIG. 2) extends vertically in the y axis direction through the top of portion 18 and opens into the upper edge surface of the cavity 28 adjacent the upper right corner thereof. An adjustable y-axis direction position locator, in the form of a threaded adjustment screw 38 having a non-abrasive tip, is received within bore 36 for selective movement in the y axis direction into contact with an upper edge 40 of lens 12. A threaded bore 42 (dashed lines in FIG. 2) extends horizontally in the x axis direction through the right side of portion 14 and opens into the right edge surface of cavity 28 adjacent the upper right corner thereof. An adjustable $\theta_z$ direction position locator, in the form of an adjustment screw 43 having a non-abrasive tip, is received within bore 42 for selective movement in the x axis direction into contact with a right edge 44 of lens 12.

A blind-ended, smooth bore 46 (dashed lines in FIG. 2) extends vertically in the y axis direction from an opening onto the bottom edge surface of the cavity 28 adjacent the lower left corner thereof. A compression coil spring 48 is positioned within the bore 46 to exert an upward force $F_s$ (FIG. 3) on the bottom edge 49 of lens 12 adjacent the bottom left corner thereof. The front surface 51 of cavity 28 is made planar in the x-y plane of the optical system.

The lens retainer 16 (FIG. 1) is a thin plate-like member comprising front and rear planar vertical faces 54, 55 between which the opening 17 extends. Bores 57, 58 extend in the z axis direction between faces 54, 55, in respective positions above and below the opening 17. The bores 57, 58 are smooth, and bore 57 is elongated in the vertical y axis direction. The vertical spacing between bores 57, 58 matches the vertical spacing of the corresponding bores 31, 32 located above and below the cavity 28 of the carrier 14. Screws 61, 62 (FIG. 1) are respectively passed through the bores 57, 58 and threaded into the bores 31, 32, bringing the surface 54 of retainer 16 into abutment with the curved surface 64 of lens 12. The elongation of bore 57 in the y axis direction permits the retainer 16 to wrap around the lens 12 as the screws 61, 62 are tightened, thereby pressing the plano surface 65 of lens 12 flush against the x-y planar surface 51 of the cavity 28.

The lens 12 (see FIGS. 1, 2 and 4) has upper and lower horizontal x-z planar cut edges 40, 49 and left and right vertical y-z planar cut edges 66, 44. The particular lens 12, shown for illustrative purposes, is of a convex plano monolithic construction, having a convex front surface 64 and an x-y planar rear surface 65. The surface 64 is cylindrically contoured to provide curvature (i.e. magnification) in the y axis direction, but uniformity (i.e. no magnification) in the x axis direction. The contour of the convex surface 64 has a cylindrical curvature centered about a lens cylindrical axis 67 indicated in FIG. 1. The lens 12 acts to provide magnification in the y axis direction only, so can be used to control the y axis direction extent of the spot size of a laser elliptical scanning beam directed along the z axis toward the lens 12.

Ideally, lens 12 is shaped so that the cylindrical axis 67 of surface 64 is coincident with the midpoints of the y axis extents of the edges 66, 44 and is parallel to the x-z planes of the edges 40, 49. However-, most lenses are not ideal. The mount 10, therefore, has a purpose of assuring that the lens axis 67 of cylindrical surface 64 will be precisely aligned with the incident optical beam in the x-z plane. Slight variations in translational alignment of lens 12 in the x axis (non-magnification) direction will have little effect, since magnification occurs in the y axis direction only. Alignment in the z axis direction affects focusing only and will be adequately accommodated by the attachment of pedestals 19, 20 to the underlying optical system structure. Of greatest concern, therefore, are adjustments in the y axis (magnification) translational and $\theta_z$ rotational directions. Positioning for $\theta_y$ and $\theta_x$ rotation is accomplished by assuring that the plano surface 51 (orthogonally cut relative to the edges 40, 49, and 66, 44) is in alignment with the x-y plane of the optical system. This is done by shaping the inner surface 51 (FIG. 3) of cavity 28 to be vertically planar in the x-y plane, as already described.

As shown in FIGS. 1 and 2, the plano surface 65 of the cylindrical lens 12 is pressured in the z axis direction against the recessed x-y planar surface 51 of the cavity 28 of lens carrier 14. This positions the lens 12 in the $\theta x$ and $\theta y$ rotational directions sufficiently for laser printer beam shaping applications without the need for adjustment. The pressure is provided through resilient means, provided by tightening the thin plate-like retainer 16 about the rearwardly projecting curved surface 64 of the lens 12, using the lock screws 61, 62.

In operation, as indicated in FIG. 4, a clockwise moment $\theta_2 M$ is applied to the lens 12 by the force $F_s$ of the spring 48 acting against the surface 49 adjacent the bottom left corner of lens 12. This provides a clockwise $\theta_z$ directed biasing torque on the lens 12 when opposed by the tip of screw 38 which is in contact with the surface 40 at the diagonally opposite corner of lens 12. The biasing torque forces the lens 12 also against the tip of screw 43 which, together with the tip of screw 38, supplies the forces $F_y$, $F_{\theta z}$ indicated. Pin 33 acts as a guide against which the lens is also urged; and spring 48, thus, also provides a biasing force in the y axis direction. Adjustment of the lens 12 in the y axis (magnification) translational and $\theta_z$ rotational directions may be made against the biasing of spring 48 by advancing the screw 38 and/or 43. Moving the screw 43 in the x axis direction will move the lens 12 in a $\theta_z$ rotational direction about the pivot point 33, to set the $\theta_z$ position against the biasing torque of spring 48. Moving the screw 38 in the y axis direction will move the lens 12 in the y axis direction to set the y position of the lens 12. The lens 12 will remain loaded against the guide pin 33 and tips at screws 38 and 43 during this action due to the clockwise $\theta_z$ bias. Adjustment of the $\theta_z$ angular positioning of lens 12 is accomplished first, so that the y axis adjustment is not affected thereby. The loading of the lens 12 against the locators 33, 43 will maintain the $\theta_z$ adjustment, while the y axis adjustment is made. Once the y axis and $\theta_z$ positions have both been set, the screws 61, 62 are tightened down fully to lock the lens 12 against further movement relative to carrier 14.

A clockwise moment $\theta_2 M$ is chosen to load the lens 12 against the locators 33, 38, 43, so that standard right-hand threaded lockdown screws 61, 62 will not dislodge the lens 12 from its adjusted position during lockdown. Because the lens retainer 16 does not itself function to locate the lens 12, but only to apply a pressure in the z axis direction, it can be an inexpensive non-precision part. And, unlike the corresponding retainer of the '161 device, the retainer 16 is not directly involved in the torque applying process at all. The retainer 16 can, therefore, be of much simpler construction. It may comprise, for example, a simple flat sheet of metal of no particular required shape, that can deform, preferably elastically, about the lens 12 during lockdown and, thus, clamp the lens 12 in the desired position.

Those skilled in the art to which the invention relates will appreciate that other substitutions and modifications can be made to the described embodiments without departing from the spirit and scope of the invention as described by the claims below.

I claim:

1. In combination with a cylindrical lens, a device for positioning said lens translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including a lens carrier; means mounting said lens on said lens carrier; means for angularly positioning said lens relative to said $\theta_x$ and $\theta_y$ directions; means for translationally positioning said lens relative to said other of said x and y axes directions; means for translationally positioning said lens relative to said z axis direction; means for adjustably translationally positioning said lens relative to said one of said x and y directions; and means for adjustably angularly positioning said lens relative to said $\theta_z$ direction; and said combination being characterized in that:

said lens is of monolithic construction;

said device further comprises means, acting between said lens and said carrier, for applying a biasing torque directly on said lens in said $\theta_z$ direction; and said means for adjustably angularly positioning said lens relative to said $\theta_z$ direction comprises means, acting between said lens and said carrier, for moving said lens rotationally in said $\theta_z$ direction relative to said carrier, against said biasing torque applied by said biasing torque means.

2. A combination as in claim 1, wherein said means for applying a biasing torque further comprises means, acting between said lens and said carrier, for applying a biasing force directly on said lens in said one of said x and y axes directions; and said means for adjustably translationally positioning said lens relative to said one of said x and y directions comprises means, acting between said lens and said carrier, for moving said lens translationally in said one of said x and y directions relative to said carrier, against said biasing force applied by said biasing force means.

3. A combination as in claim 2, for positioning a lens having a generally rectangular cross-sectional shape with side edges and corners, and wherein said means for applying a biasing torque comprises a resilient element acting between said carrier and a point on one of said side edges, adjacent one corner of said lens; and said means for adjustably angularly positioning comprises a first movable locator acting between said carrier and a point on another one of said side edges, adjacent a diagonally opposite corner of said lens.

4. A combination as claim 3, wherein said means for adjustably translationally positioning said lens comprises a guide member located on said carrier and contacting said lens at a point on a different one of said side edges, adjacent said one corner; and a second movable locator acting between said carrier and a point on another different one of said side edges, adjacent said diagonally opposite corner of said lens.

5. A combination as in claim 4 wherein id carrier has a cavity for receiving said lens, and wherein said biasing torque applying means comprises a spring received in said cavity and acting between said carrier and said lens.

6. A combination as in claim 5, wherein said adjustably angular positioning means comprises a first bore in said carrier opening into said cavity, and said first movable locator being in engagement with said first bore and protruding into said cavity into contact with said lens.

7. A combination as in claim 6, wherein said adjustably translationally positioning means comprises a second bore in said carrier opening into said cavity, said second bore being directed at right angles to said first bore; and said second locator being in engagement with said second bore and protruding into said cavity into contact with said lens.

8. A combination as in claim 1, wherein said carrier has a cavity for receiving said lens; wherein said device further comprises a lens retainer, and means attaching said lens retainer to said carrier for applying a force on said lens in said z axis direction to retain said lens in said cavity; and wherein said means for applying a biasing torque in said $\theta_z$ direction comprises spring means acting in said cavity between said carrier and said lens.

9. A combination as in claim 8, wherein said means for positioning said lens relative to said $\theta_z$ direction comprises a first protuberance projecting into said cavity, between said carrier and said lens; and means mounting said first protuberance to said carrier for selective movement of said first protuberance against said lens in opposition to the action of said biasing torque.

10. A combination as in claim 9 wherein said means for adjustably translationally positioning said lens relative to said one of said x and y directions comprises a second protuberance projecting into said cavity, between said carrier and said lens; and means mounting said second protuberance to said carrier for selective movement of said second protuberance against said lens in opposite on to the action of said component of said biasing torque acting in said one of said x and y directions.

11. A device for positioning a cylindrical lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device comprising:
a lens carrier having a cavity for receiving said lens;
means for angularly positioning said lens together with said carrier in said $\theta_x$ and $\theta_y$ directions;
means for translationally positioning said lens together with said carrier in said other of said x and y axes directions;
means for translationally positioning said lens together with said carrier in said z axis direction;
means for adjustably translationally positioning said lens relative to said carrier in said one of said x and y directions;
means, acting directly between said lens and said carrier, for applying a biasing torque directly on said lens in said $\theta_z$ direction; and
means, acting directly between said lens and said carrier, for adjustably angularly positioning said lens relative to said carrier in said $\theta_z$ direction, against said biasing torque applied by said biasing torque means.

12. A device as in claim 11, wherein said means for applying a biasing torque further comprises means, acting directly between said lens and said carrier, for applying a biasing force directly on said lens relative to said carrier in said one of said x and y axes directions; and said means for adjustably translationally positioning said lens in said one of said x and y directions comprises means, acting directly between said lens and said carrier, for moving said lens translationally in said one of said x and y directions relative to said carrier, against said biasing force applied by said biasing force means.

13. A method for positioning a cylindrical lens translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens being of monolithic construction and including a curved cylindrical surface for providing magnification in one of said x and y axes directions; said method including mounting said lens on a lens carrier; angularly positioning said lens relative to said $\theta_x$ and $\theta_y$ directions; translationally positioning said lens relative to said other to said x and y axes directions; translationally positioning said lens relative to said z axis direction; translationally positioning said lens relative to said one of said x and y directions; and angularly positioning said lens relative to said $\theta_z$ direction; and said method being characterized in that:
said steps of angularly positioning said lens relative to said $\theta_x$ and $\theta_y$ directions, and trnaslationally positioning said lens relative to said z axis direction comprise positioning said carrier, with said lens inserted in said carrier, relative to said $\theta_x$, $\theta_y$ and z axis directions;
said method further comprises a step of applying a force acting between said lens and said carrier, for applying a biasing torque directly on said lens in said $\theta_z$ direction; and
said step of angularly positioning said lens relative to said $\theta_z$ direction comprises applying a restoring force acting between said lens and said carrier, for moving said lens rotationally in said $\theta_z$ direction relative to said carrier, against said applied biasing torque.

14. A method as in claim 13, wherein said step of applying a force acting between said lens and said carrier, also applies a biasing force directly on said lens in said one of said x and y axes directions; and said step of translationally positioning said lens relative to said one of said x and y directions comprises applying an opposing force acting between said lens and said carrier, for moving said lens translationally in said one of said x and y directions against said biasing force in said one of said x and y directions.

15. A method as in claim 14, for positioning a lens having a generally rectangular cross-sectional shape with side edges and corners, and wherein said step of applying a force, applies said force using a resilient element acting between said carrier and a point on one of said side edges, adjacent one corner of said lens; and said step of angular positioning said lens relative to said $\theta_z$ direction comprises moving a first locator to act between said carrier and a point on another one of said side edges, adjacent a diagonally opposite corner of said lens.

16. A method as in claim 15, wherein said step of translationally positioning said lens relative to said one of said x and y directions comprises contacting said lens by a guide member located on said carrier at a point on a different one of said side edges, adjacent said one corner; and moving a second locator to act between said carrier and a point on another different one of said side edges, adjacent said diagonally opposite corner of said lens.

17. A method as in claim 16, wherein said step of mounting said lens on said lens carrier comprises inserting said lens within a cavity of said lens carrier, and said step of applying a force comprises applying said force using a spring received in said cavity and acting between said carrier and said lens.

18. A method as in claim 17, wherein said step of angularly positioning said lens relative to said $\theta_z$ direction comprises engaging said first locator in a first bore formed in said carrier and opening into said cavity; and moving said first locator in said first bore to protrude into said cavity into contact with said lens.

19. A method as in claim 18, wherein said step of translationally positioning said lens relative to said one of said x and y directions comprises engaging said second locator in a second bore formed in said carrier and opening into said cavity, said second bore being directed at right angles to said first bore; and moving said second locator in said second bore to protrude into said cavity into contact with said lens.

20. A method as in claim 14, wherein said method further comprises attaching a lens retainer to said carrier and applying a force on said lens in said z axis direction using aid lens retainer, to lock said $\theta_z$ and one of said x and y direction positions of aid lens relative to said carrier.

* * * * *